(12) United States Patent
Tada et al.

(10) Patent No.: US 8,872,793 B2
(45) Date of Patent: Oct. 28, 2014

(54) SENSOR MODULE AND DISPLAY DEVICE

(75) Inventors: Masahiro Tada, Tokyo (JP); Takashi Nakamura, Saitama (JP); Hirotaka Hayashi, Fukaya (JP); Masayoshi Fuchi, Ageo (JP); Takahiko Endo, Okegawa (JP); Miyuki Ishikawa, Kumagaya (JP); Takashi Okada, Kumagaya (JP); Takayuki Imai, Fukaya (JP); Satoru Tomita, Kawagoe (JP); Yasuo Saruhashi, Fukaya (JP)

(73) Assignee: Japan Display Inc., Tokyo (JP)

( * ) Notice: Subject to any disclaimer, the term of this patent is extended or adjusted under 35 U.S.C. 154(b) by 192 days.

(21) Appl. No.: 13/525,507

(22) Filed: Jun. 18, 2012

(65) Prior Publication Data
US 2013/0002603 A1 Jan. 3, 2013

(30) Foreign Application Priority Data

Jun. 30, 2011 (JP) ................ 2011-146468

(51) Int. Cl.
*G06F 3/045* (2006.01)
*G06F 3/041* (2006.01)
*G06F 3/044* (2006.01)

(52) U.S. Cl.
CPC .............. *G06F 3/044* (2013.01); *G06F 3/0416* (2013.01)
USPC ........................................ 345/174; 345/173

(58) Field of Classification Search
USPC .......................................... 345/173–178, 104
See application file for complete search history.

(56) References Cited

U.S. PATENT DOCUMENTS

| 2008/0018612 | A1* | 1/2008 | Nakamura et al. ............ 345/173 |
| 2010/0079401 | A1* | 4/2010 | Staton ........................... 345/174 |
| 2012/0044176 | A1 | 2/2012 | Nakamura et al. |
| 2013/0002603 | A1 | 1/2013 | Tada et al. |

FOREIGN PATENT DOCUMENTS

JP 2009-3414 1/2009

OTHER PUBLICATIONS

U.S. Appl. No. 13/651,657, filed Oct. 15, 2012, Imai et al.
U.S. Appl. No. 13/724,899, filed Dec. 21, 2013, Tomita, et al.
U.S. Appl. No. 13/724,119, filed Dec. 21, 2012, Tada.

* cited by examiner

*Primary Examiner* — Alexander S Beck
*Assistant Examiner* — Brent Castiaux
(74) *Attorney, Agent, or Firm* — Oblon, Spivak, McClelland, Maier & Neustadt, L.L.P.

(57) ABSTRACT

According to one embodiment, a sensor module includes a first sensor circuit, a second sensor circuit and a differential circuit. The first sensor circuit includes a first detection electrode, a first amplifier formed of a thin-film transistor and a first coupling capacitor. The second sensor circuit includes a second detection electrode, a second amplifier formed of a thin-film transistor and a second coupling capacitor. The differential circuit is connected to the drain electrode of the first amplifier and the drain electrode of the second amplifier.

9 Claims, 7 Drawing Sheets

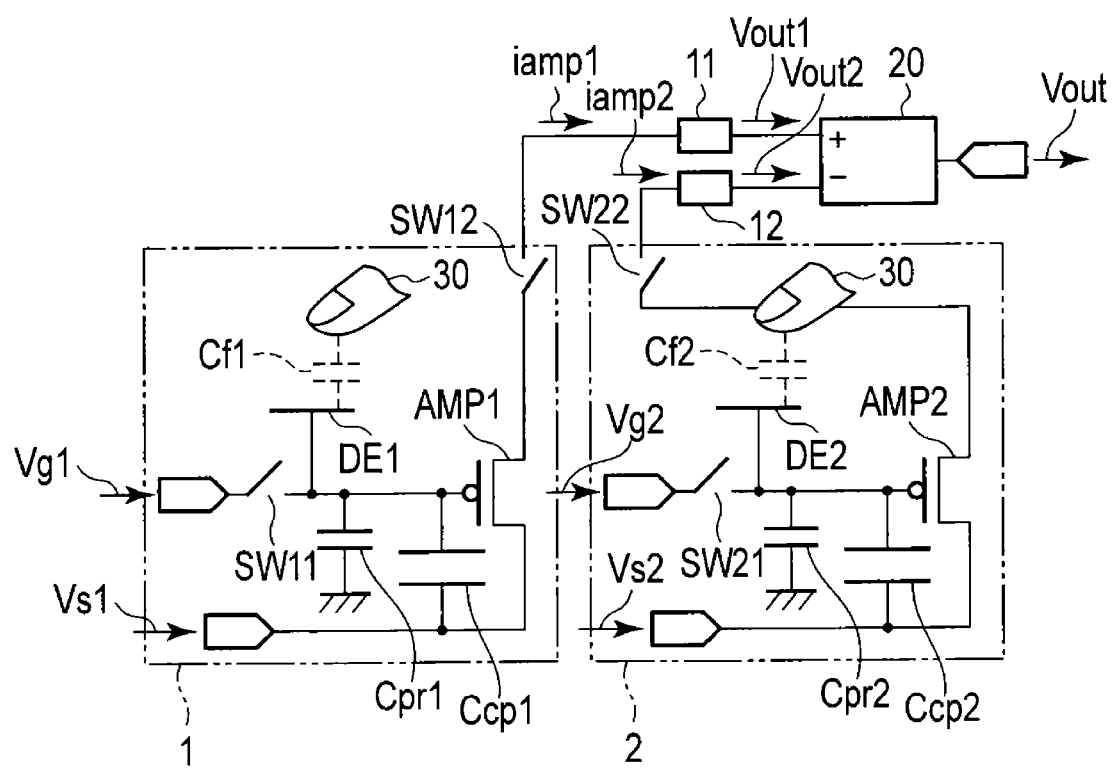
F I G. 1

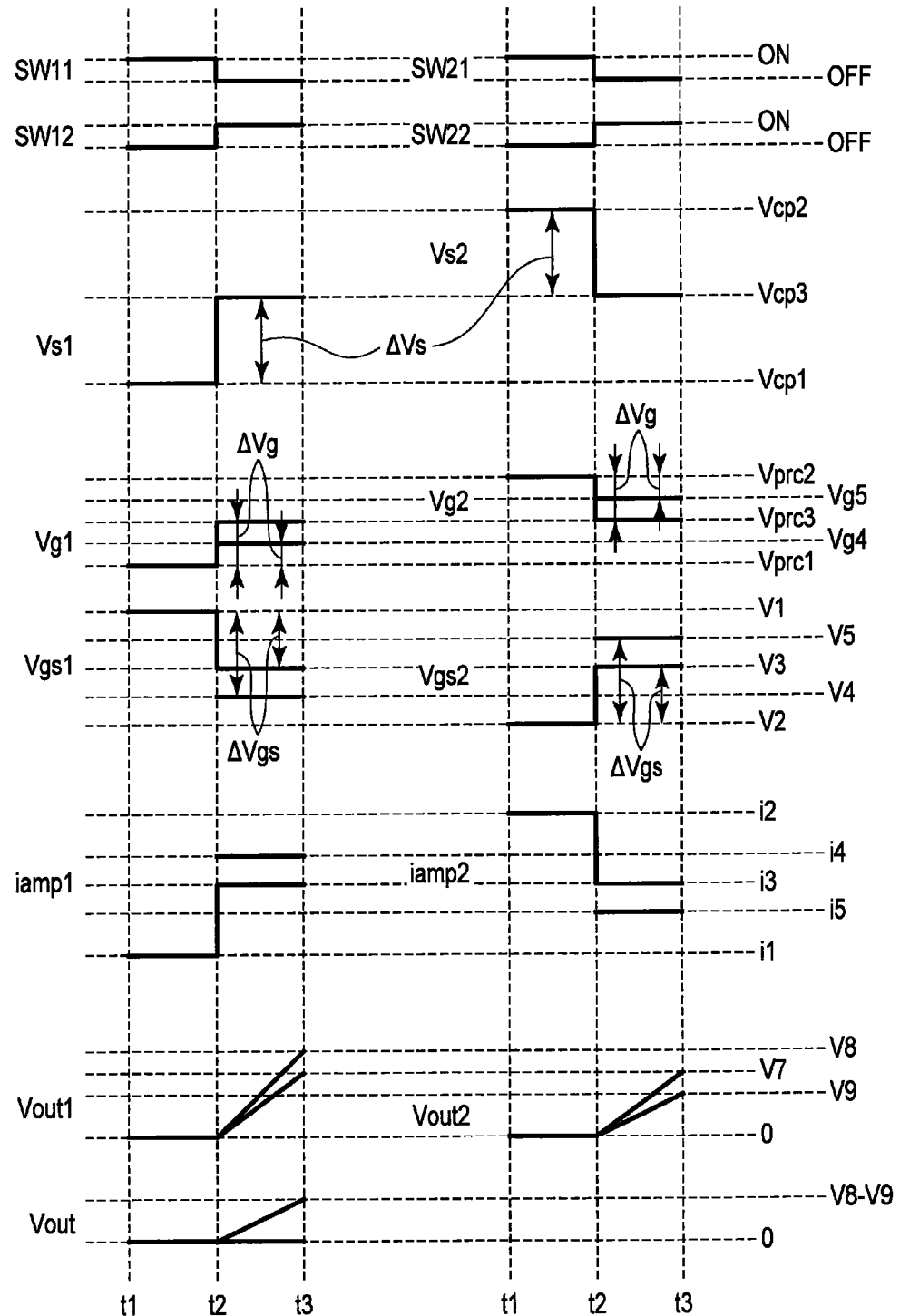
F I G. 2

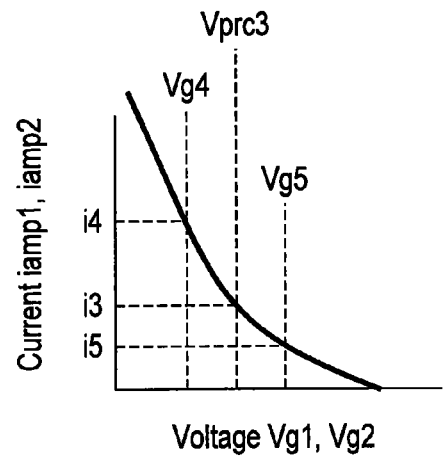
F I G. 3
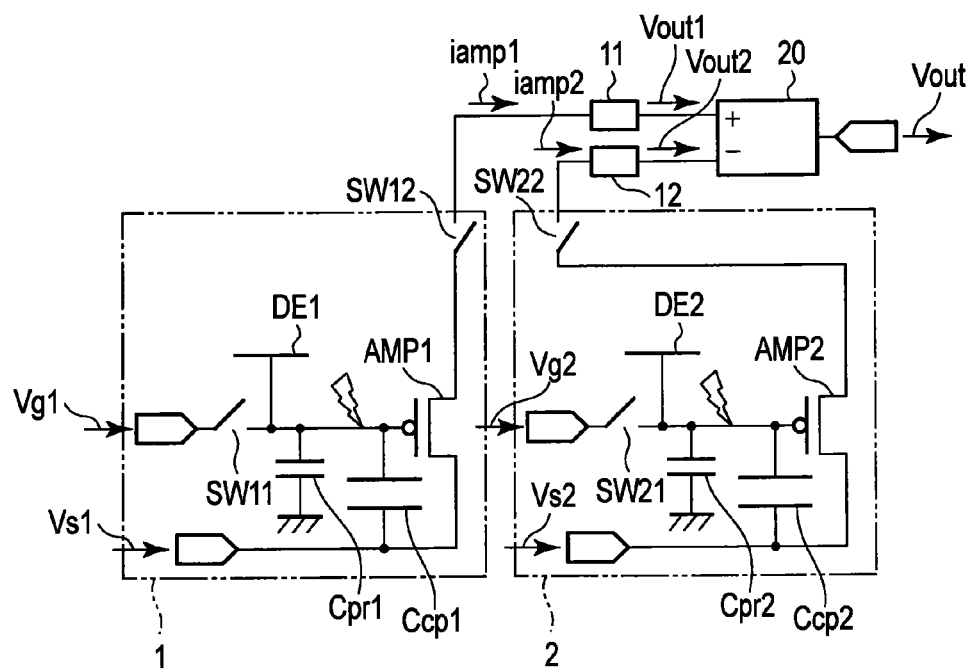
F I G. 4

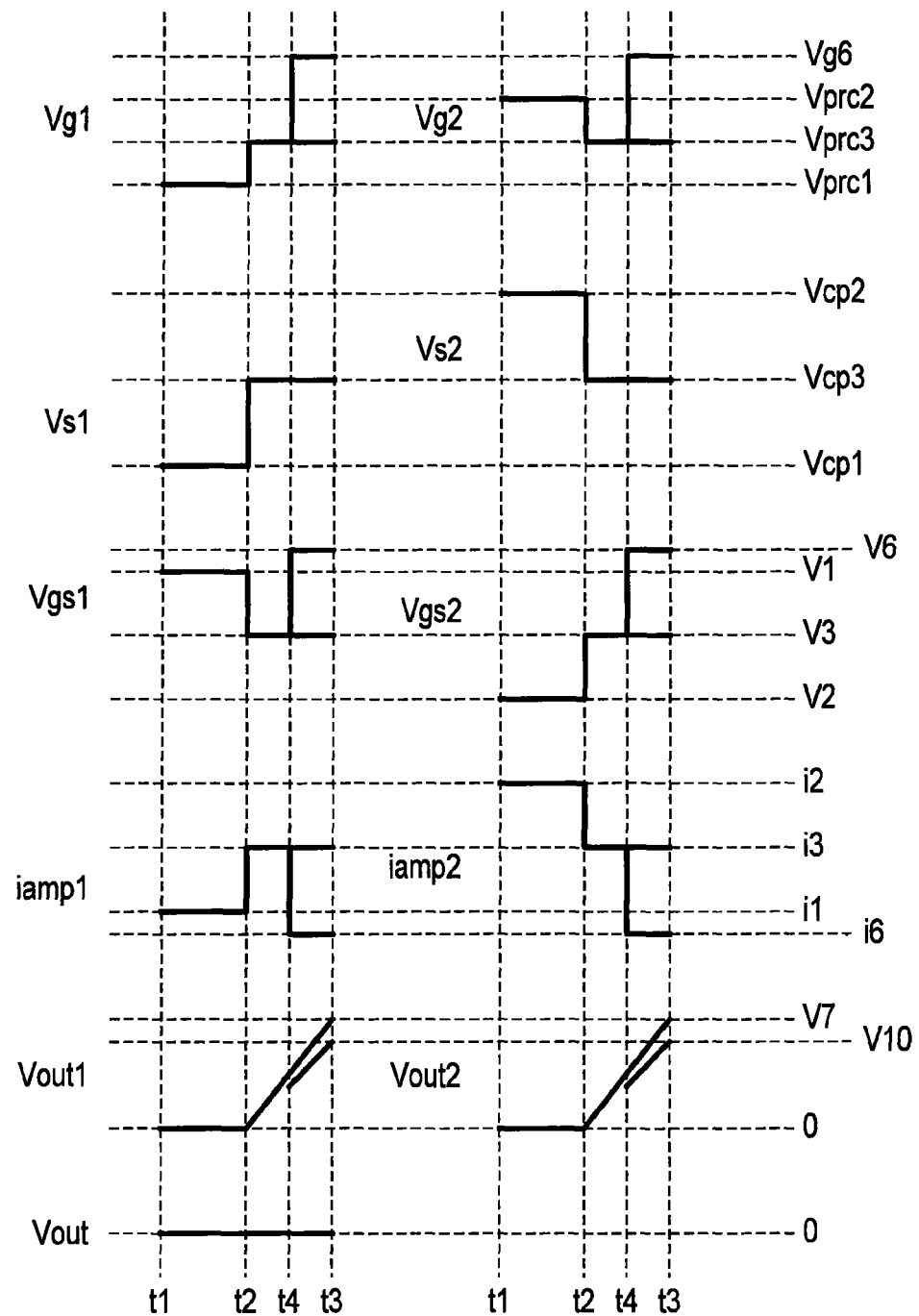
F I G. 5

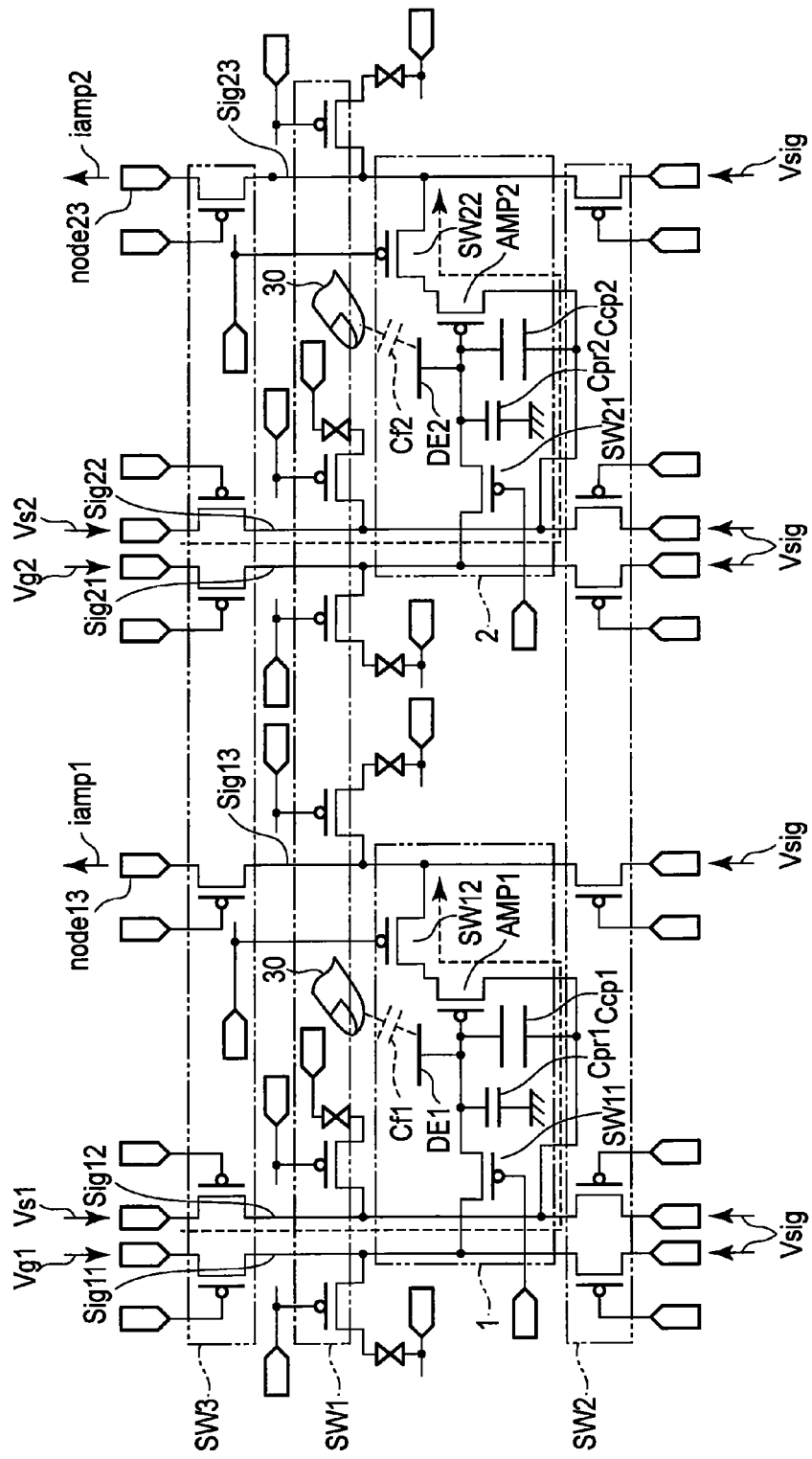
F I G. 6

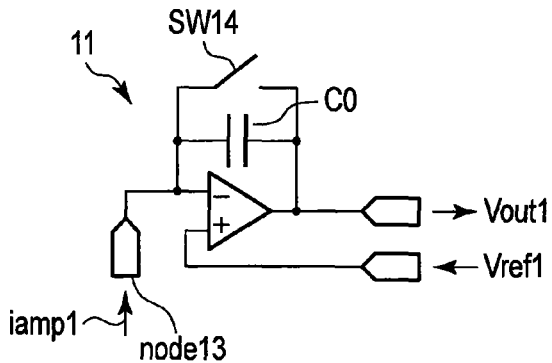
F I G. 7
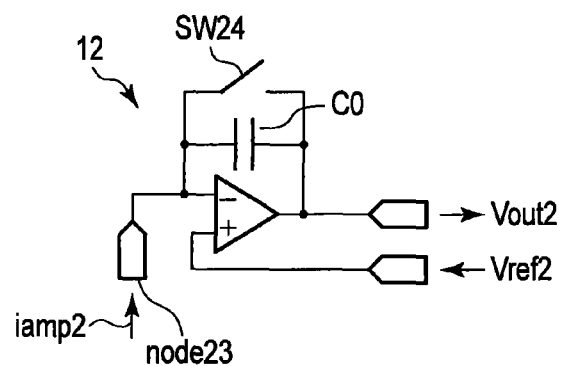
F I G. 8
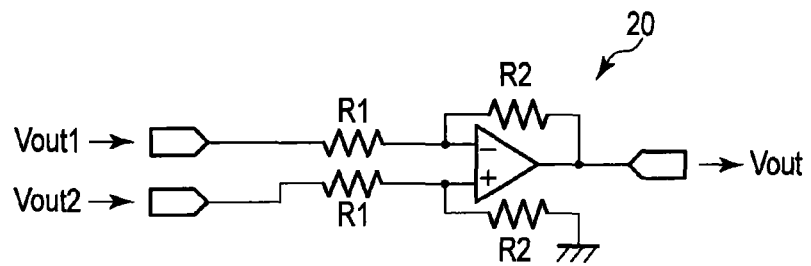
F I G. 9

SENSOR MODULE AND DISPLAY DEVICE

CROSS-REFERENCE TO RELATED APPLICATIONS

This application is based upon and claims the benefit of priority from prior Japanese Patent Application No. 2011-146468, filed Jun. 30, 2011, the entire contents of which are incorporated herein by reference.

FIELD

Embodiments described herein relate generally to a sensor module and a display device comprising the sensor module.

BACKGROUND

Recently years, flat sensor modules or so-called touchpanels used for detecting a finger touch position are applied to home electrical appliances including OA appliances. In an electronic device having a touchpanel function, it is studied to add the touchpanel function by separately attaching a touchpanel board to a display device such as a liquid crystal display device or organic electroluminescent display device.

A resistance-type touchpanel can extract positional information of a portion touched (depressed) by a finger by arranging mechanical switches at respective intersections of wirings arranged in a matrix form, sequentially applying pulse voltages to address lines, measuring a potential variation of a signal line at desired time and processing a signal. Further, a capacitance-type touchpanel can extract positional information of a portion touched by an input unit by deriving a variation in the capacitance between a detection electrode and a finger.

BRIEF DESCRIPTION OF THE DRAWINGS

FIG. 1 is a circuit diagram showing a portion of a sensor module according to a first embodiment.

FIG. 2 is a diagram for illustrating the operation of the sensor module shown in FIG. 1 and is a timing chart showing a variation of signals (voltage, current) related to the operation of the sensor module.

FIG. 3 is a graph showing a variation in a current (iamp1, iamp2) with respect to a voltage (Vg1, Vg2) in the sensor module.

FIG. 4 is a circuit diagram showing a portion of the sensor module set in a state in which external noise is produced.

FIG. 5 is a diagram for illustrating the operation of the sensor module shown in FIG. 4 and is a timing chart showing a variation of signals (voltage, current) related to the operation of the sensor module.

FIG. 6 is a circuit diagram showing a portion of a liquid crystal display device according to a second embodiment.

FIG. 7 is a circuit diagram showing a first integration circuit according to the second embodiment.

FIG. 8 is a circuit diagram showing a second integration circuit according to the second embodiment.

FIG. 9 is a circuit diagram showing a differential circuit according to the second embodiment.

DETAILED DESCRIPTION

Figure 10:
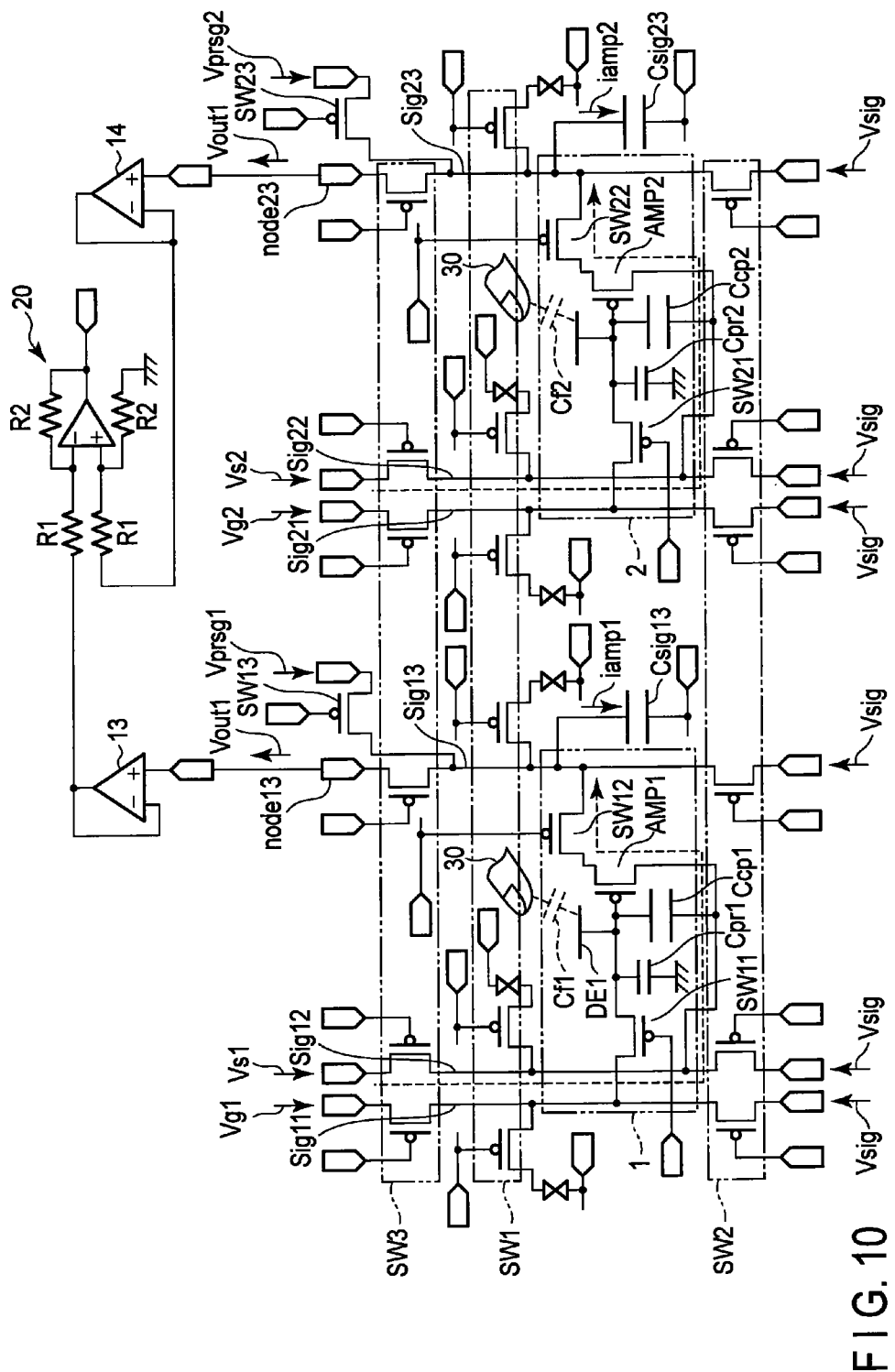
FIG. 10 is a circuit diagram showing a portion of a liquid crystal display device according to a third embodiment.

In general, according to one embodiment, there is provided a sensor module comprising:

a first sensor circuit comprising a first detection electrode whose detection capacitance varies according to an input operation by an input unit after a first precharge voltage is applied to the first detection electrode, a first amplifier formed of a thin-film transistor including a gate electrode connected to the first detection electrode and configured to adjust a first coupling signal supplied to a source electrode according to an attenuation amount of the first precharge voltage on the first detection electrode and output an adjusted first coupling signal from a drain electrode, and a first coupling capacitor connected between the source electrode and gate electrode of the first amplifier;

a second sensor circuit comprising a second detection electrode whose detection capacitance varies according to an input operation by the input unit after a second precharge voltage is applied to the second detection electrode, a second amplifier formed of a thin-film transistor including a gate electrode connected to the second detection electrode and configured to adjust a second coupling signal supplied to a source electrode according to an attenuation amount of the second precharge voltage on the second detection electrode and output an adjusted second coupling signal from a drain electrode, and a second coupling capacitor connected between the source electrode and gate electrode of the second amplifier; and a differential circuit connected to the drain electrode of the first amplifier and the drain electrode of the second amplifier.

A sensor module according to a first embodiment is explained in detail below with reference to the drawings.

As shown in FIG. 1, the sensor module includes a first sensor circuit 1, second sensor circuit 2, first integration circuit 11, second integration circuit 12, and a differential circuit 20 that outputs a difference between outputs of the sensor circuits. First detection electrode DE1 (first sensor circuit 1) and second detection electrode DE2 (second sensor circuit 2) are arranged with a sufficiently short distance in comparison with the touch width of input means (input unit) 30 such as a finger or conductor. That is, the detection capacitances of first detection electrode DE1 and second detection electrode DE2 both vary according to an input operation by the input means 30.

The first sensor circuit 1 includes the first detection electrode DE1, first amplifier AMP1, first coupling capacitor Ccp1, first precharge control switch SW11 and first output switch SW12. Further, in the first sensor circuit 1, parasitic capacitor Cpr1 is formed.

As shown in FIG. 1 and FIG. 2, the detection capacitance of the first detection electrode DE1 varies according to an input operation by the input means 30 after first precharge voltage Vprc1 is applied thereto. The first amplifier AMP1 comprises a P-type thin-film transistor (TFT) including a gate electrode connected to the first detection electrode DE1. The first amplifier AMP1 adjusts first coupling signal Vs1 (coupling voltage Vcp3) supplied to the source electrode according to an attenuation amount of the first precharge voltage Vprc1 on the first detection electrode DE1, and outputs the adjusted first coupling signal from the drain electrode. In this case, the first precharge voltage Vprc1 is a negative value. The attenuation amount of the first precharge voltage Vprc1 is an amount by which the voltage level becomes shallower towards zero from the negative value.

The first coupling capacitor Ccp1 is connected between the source electrode and gate electrode of the first amplifier AMP1. The first precharge control switch SW11 is connected to the first detection electrode DE1 and is selectively switched into a nonconductive state or conductive state in which the first precharge voltage Vprc1 is output to the first detection electrode DE1.

The first output switch SW12 is connected between the drain electrode of first amplifier AMP1 and the differential circuit 20. The first output switch SW12 is selectively switched into a nonconductive state or conductive state in which the adjusted first coupling signal Vs1 (coupling voltage Vcp3) is output to the first integration circuit 11 (differential circuit 20). In other words, the first output switch SW12 is selectively switched into a nonconductive state or conductive state in which first amplifier current iamp1 flowing in the first amplifier AMP1 and corresponding to the adjusted first coupling signal Vs1 (coupling voltage Vcp3) is output to the first integration circuit 11.

The source electrode of first amplifier AMP1 is supplied with first coupling signal Vs1. The first coupling signal Vs1 is set to coupling voltage Vcp1 of a voltage level that is shifted to a negative side from coupling voltage Vcp3 (reference voltage) when the first precharge voltage Vprc1 is applied to the first detection electrode DE1. The first coupling signal Vs1 is set to coupling voltage Vcp3 (reference voltage) after the first precharge voltage Vprc1 is applied to the first detection electrode DE1.

The second sensor circuit 2 includes the second detection electrode DE2, second amplifier AMP2, second coupling capacitor Ccp2, second precharge control switch SW21 and second output switch SW22. Further, in the second sensor circuit 2, parasitic capacitor Cpr2 is formed.

The detection capacitance of second detection electrode DE2 varies according to an input operation by the input means 30 after second precharge voltage Vprc2 is applied thereto. The second amplifier AMP2 comprises a P-type TFT including a gate electrode connected to the second detection electrode DE2. The second amplifier AMP2 adjusts second coupling signal Vs2 (coupling voltage Vcp3) supplied to the source electrode according to an attenuation amount of the second precharge voltage Vprc2 on the second detection electrode DE2, and outputs the adjusted second coupling signal from the drain electrode. In this case, the second precharge voltage Vprc2 is a positive value. The attenuation amount of second precharge voltage Vprc2 is an amount by which the voltage level becomes shallower towards zero from the positive value.

The second coupling capacitor Ccp2 is connected between the source electrode and gate electrode of second amplifier AMP2. The second precharge control switch SW21 is connected to the second detection electrode DE2 and is selectively switched into a nonconductive state or conductive state in which the second precharge voltage Vprc2 is output to the second detection electrode DE2.

The second output switch SW22 is connected between the drain electrode of second amplifier AMP2 and the differential circuit 20. The second output switch SW22 is selectively switched into a nonconductive state or conductive state in which the adjusted second coupling signal Vs2 (coupling voltage Vcp3) is output to the second integration circuit 12 (differential circuit 20). In other words, the second output switch SW22 is selectively switched into a nonconductive state or conductive state in which second amplifier current iamp2 flowing in the second amplifier AMP2 and corresponding to the adjusted second coupling signal Vs2 (coupling voltage Vcp3) is output to the second integration circuit 12.

The source electrode of second amplifier AMP2 is supplied with the second coupling signal Vs2. The second coupling signal Vs2 is set to coupling voltage Vcp2 of a voltage level that is shifted to a positive side from the coupling voltage Vcp3 (reference voltage) when the second precharge voltage Vprc2 is applied to the second detection electrode DE2. The second coupling signal Vs2 is set to the coupling voltage Vcp3 (reference voltage) after the second precharge voltage Vprc2 is applied to the second detection electrode DE2.

In this case, the absolute value (|Vcp1−Vcp3|) of a difference between the voltage level that is shifted to the negative side from coupling voltage Vcp3 (reference voltage) and the coupling voltage Vcp3, and the absolute value (|Vcp2−Vcp3|) of a difference between the voltage level that is shifted to the positive side from the coupling voltage Vcp3 (reference voltage) and the coupling voltage Vcp3 are the same value.

The first integration circuit 11 (current integration circuit) is connected between the drain electrode of first amplifier AMP1 and the differential circuit 20. The first integration circuit 11 integrates the first amplifier current iamp1 that is an output of the first sensor circuit 1 and outputs the integrated current as first integrated voltage Vout1 to the differential circuit 20.

The second integration circuit 12 (current integration circuit) is connected between the drain electrode of second amplifier AMP2 and the differential circuit 20. The second integration circuit 12 integrates the second amplifier current iamp2 that is an output of the second sensor circuit 2 and outputs the integrated current as second integrated voltage Vout2 to the differential circuit 20.

The differential circuit 20 derives a difference between the first integrated voltage Vout1 and second integrated voltage Vout2 and outputs output voltage Vout as the result of derivation.

Next, the further detailed configuration of the sensor module is explained together with the operation thereof.

In the first sensor circuit 1, detection capacitor (electrostatic coupling capacitor) Cf1 is formed by setting the input means 30 close to first detection electrode DE1 with an insulating member disposed therebetween. The detection capacitor Cf1 and parasitic capacitor Cpr1 are formed between the gate electrode of first amplifier AMP1 and the ground.

The first coupling signal Vs1 is supplied to the source electrode of first amplifier AMP1. The first gate signal Vg1 (first precharge voltage Vprc1) is supplied to the gate electrode of first amplifier AMP1 in a period between time t1 at which the first precharge control switch SW11 is turned on and time t2.

If the first precharge control switch SW11 is turned off at time t2, the voltage level of first coupling signal Vs1 is changed from the coupling voltage Vcp1 to the coupling voltage Vcp3 (Vcp3=Vcp1+ΔVs). If an input (touch) operation by the input means 30 is not performed, variation amount ΔVg of the first gate signal Vg1 is set to a value expressed by the following equation (Eq. 1).

$$\Delta Vg = \Delta Vs \cdot (1/Cpr/(1/Cpr+1/Cpr)) \quad \text{Eq. 1}$$

At this time, Cpr=Cpr1 and Ccp=Ccp1.

In the second sensor circuit 2, detection capacitor (electrostatic coupling capacitor) Cf2 is formed by setting the input means 30 close to second detection electrode DE2 with an insulating member disposed therebetween. The detection capacitor Cf2 and parasitic capacitor Cpr2 are formed between the gate electrode of second amplifier AMP2 and the ground.

The second coupling signal Vs2 is supplied to the source electrode of second amplifier AMP2. The second gate signal Vg2 (second precharge voltage Vprc2) is supplied to the gate electrode of second amplifier AMP2 in a period between time t1 at which the second precharge control switch SW21 is turned on and time t2.

If the second precharge control switch SW21 is turned off at time t2, the voltage level of second coupling signal Vs2 is changed from the coupling voltage Vcp2 to the coupling voltage Vcp3 (Vcp3=Vcp2−ΔVs). If the input (touch) operation by the input means 30 is not performed, variation amount ΔVg of the second gate signal Vg2 is set to a value expressed by the above equation (Eq. 1). At this time, Cpr=Cpr1 and Ccp=Ccp1.

In this case, it is supposed that first precharge voltage Vprc1 and second precharge voltage Vprc2 at time t1 are respectively set to values expressed by the following equations (Eq. 2) and (Eq. 3) if the input (touch) operation by the input means 30 is not performed.

$$Vprc1=Vprc3-\Delta Vs \cdot (1/Cpr/(1/Ccp+1/Cpr)) \quad \text{Eq. 2}$$

$$Vprc2=Vprc3+\Delta Vs \cdot (1/Cpr/(1/Ccp+1/Cpr)) \quad \text{Eq. 3}$$

If the input (touch) operation by the input means 30 is not performed, the first amplifier current iamp1 flowing in the first amplifier AMP1 and the second amplifier current iamp2 flowing in the second amplifier AMP2 coincide with each other (iamp1=iamp2=i3) since the relationships Vg1=Vg2=Vprc3 and Vs1=Vs2=Vcp3 are established at time t2.

If the two output currents are integrated, first integrated voltage Vout1 and second integrated voltage Vout2 are obtained, and the voltage levels of first integrated voltage Vout1 and second integrated voltage Vout2 coincide with each other (Vout1=Vout2=V7). Then, output voltage Vout obtained by deriving a difference between the first integrated voltage Vout1 and second integrated voltage Vout2 becomes zero.

If the input (touch) operation by the input means 30 is not performed as described above, voltage Vgs1 between the gate electrode and source electrode of first amplifier AMP1 is changed to voltage V3 that is changed from voltage V1 by −ΔVgs, and voltage Vgs2 between the gate electrode and source electrode of second amplifier AMP2 is changed to voltage V3 that is changed from voltage V2 by +ΔVgs.

In contrast, if the input (touch) operation by the input means 30 is performed, variations ΔVg of first gate signal Vg1 and second gate signal Vg2 at time t2 are expressed by the following equation (Eq. 4).

$$\Delta Vg=\Delta Vs \cdot (1/(Cf+Cpr))/(1/Ccp+1/(Cf+Cpr)) \quad \text{Eq. 4}$$

It is understood that variation amount ΔVg becomes smaller in comparison with a case where the input (touch) operation by the input means 30 is not performed. The first gate signal Vg1 obtained after time t2 is set to a value of voltage Vg4 expressed by the following equation (Eq. 5) and the second gate signal Vg2 is set to a value of voltage Vg5 expressed by the following equation (Eq. 6).

$$Vg4=Vprc3+\Delta Vs \cdot ((1/Cpr/(1/Ccp+1/Cpr))-(1/(Cf+Cpr))/(1/Ccp+1/(Cf+Cpr))) \quad \text{Eq. 5}$$

$$Vg5=Vprc3-\Delta Vs \cdot ((1/Cpr/(1/Ccp+1/Cpr))-(1/(Cf+Cpr))/(1/Ccp+1/(Cf+Cpr))) \quad \text{Eq. 6}$$

Since the magnitude of first amplifier current iamp1 varies from i1 to i4 and the magnitude of second amplifier current iamp2 varies from i2 to i5, iamp1 becomes larger than iamp2.

Then, the voltage level of first integrated voltage Vout1 at time t3 is set to voltage V8, the voltage level of second integrated voltage Vout2 is set to voltage V9 (V8>V9) and output voltage Vout becomes (V8−V9).

If the input (touch) operation by the input means 30 is performed as described above, the voltage Vgs1 between the gate electrode and source electrode of first amplifier AMP1 is set to V4 that is changed from voltage V1 by −Δgs and the voltage Vgs2 between the gate electrode and source electrode of second amplifier AMP2 is set to V5 that is changed from voltage V2 by +ΔVgs.

Next, the characteristics and operations of first amplifier AMP1 and second amplifier AMP2 are explained.

As shown in FIG. 3, the operations of first amplifier AMP1 and second amplifier AMP2 are not influenced even in the nonlinear characteristic as shown FIG. 3 or when they are used in a region. Further, when the characteristics of first amplifier AMP1 and second amplifier AMP2 are deviated from each other, the same operation can be expected by adjusting first precharge voltage Vprc1 and second precharge voltage Vprc2 to set adjusted first coupling signal Vs1 and adjusted second coupling signal Vs2 to the same level, that is, to establish the relationship iamp1=iamp2 while the input operation is not performed by means of the input means 30.

Next, the operation of the sensor module in a case where noise is produced in the sensor module when the input (touch) operation by the input means 30 is not performed in the sensor module is explained.

As shown in FIG. 4 and FIG. 5, since first precharge control switch SW1 and second precharge control switch SW2 are turned on in a period between time t1 and time t2, first gate signal Vg1 and second gate signal Vg2 are kept unchanged even if external noise occurs. Since first precharge control switch SW1 and second precharge control switch SW2 are changed to off in a period between time t2 and time t3, first gate signal Vg1 and second gate signal Vg2 are influenced by external noise and changed.

It is supposed that a noise voltage of ΔVn is applied to the first sensor circuit 1 at time t4 when the first sensor circuit 1 and second sensor circuit 2 are arranged adjacent to each other. Then, the voltage of the gate electrode of first amplifier AMP1 is set to Vg1=Vprc3+ΔVn=Vg6 and first integrated voltage Vout1 is changed from V7 to V10.

Likewise, in the second sensor circuit 2, if a noise voltage of ΔVn is applied thereto at time t4, the voltage of the gate electrode of second amplifier AMP2 is set to Vg2=Vprc3+ΔVn=Vg6 and second integrated voltage Vout2 is changed from V7 to V10. As is understood from the above description, output voltage Vout of the differential circuit 20 is kept unchanged even if noise occurs in the sensor module.

According to the sensor module according to the first embodiment configured as described above, the sensor module includes the first sensor circuit 1, second sensor circuit 2, first integration circuit 11, second integration circuit 12 and differential circuit 20. The differential circuit 20 can derive a difference between first integrated voltage Vout1 and second integrated voltage Vout2 to determine whether the input operation by the input means 30 is performed or not.

Further, an external noise component can be cancelled by deriving a difference between first integrated voltage Vout1 and second integrated voltage Vout2 as described above. Since whether the input operation by the input means 30 is performed or not can be determined only by taking variations in detection capacitances Cf1, Cf2 into consideration, a sensor module free from an erroneous operation can be obtained.

Further, since an external noise component can be cancelled as described above, an attempt can be made to reduce the size of the first sensor circuit 1 and second sensor circuit 2, particularly, to reduce the size of first detection electrode DE1 and second detection electrode DE2.

Based on the above description, a sensor module whose size can be reduced and that is excellent in operational stability can be obtained.

Next, a liquid crystal display device including a sensor module according to a second embodiment is explained. In this embodiment, the same portions as those of the above embodiment are denoted by the same symbols, the detailed explanation thereof is omitted and the other configuration is the same as that of the above embodiment.

As shown in FIG. 6, the liquid crystal display device comprises a liquid crystal display panel and a sensor module (first sensor circuit 1 and second sensor circuit 2). The liquid crystal display panel comprises an array substrate, a countersubstrate arranged opposite to the array substrate with a predetermined gap therebetween, and a liquid crystal layer held between the array substrate and countersubstrate. The sensor module is provided on the array substrate. The array substrate includes a plurality of wirings, a plurality of pixels (pixel circuit) and the like.

As the wirings, a plurality of signal lines Sig11 to Sig13 and Sig21 to Sig23 formed on the array substrate are given. The signal lines are used for liquid crystal (liquid crystal display panel) driving and sensor (sensor module) driving. Therefore, it can be said that a portion of the sensor module (first sensor circuit 1 and second sensor circuit 2) is commonly used by plural wirings of the array substrate.

Further, pixel switch group SW1, liquid crystal drive switch group SW2 and sensor drive switch group SW3 are formed on the array substrate. Switches configuring pixel switch group SW1, liquid crystal drive switch group SW2 and sensor drive switch group SW3 are formed of TFTs.

The signal lines are connected to liquid crystal drive switches and sensor drive switches. The signal lines can be used as both of liquid crystal driving and sensor driving signal lines by alternately turning on/off the liquid crystal drive switches and sensor drive switches. As a result, for example, the number of wirings can be minimized.

The signal line during the sensor operation is driven by a voltage that keeps off liquid crystal drive switch group SW2. Since the first sensor circuit 1 and second sensor circuit 2 can be configured if a region of at least one picture element (each picture element includes three pixels of red, green and blue, for example) is provided, it is possible to arrange the two sensor circuits with an extremely short distance.

In the first sensor circuit 1, output switch SW12 for sensor selection is connected between the drain electrode of first amplifier AMP1 and signal line Sig13. First coupling capacitor Ccp1 is connected between the gate electrode and source electrode of first amplifier AMP1. Parasitic capacitor Cpr1 is generated between the gate electrode of first amplifier AMP1 and the ground and detection capacitor Cf1 occurs if the input (touch) operation by the input means 30 is performed.

First precharge control switch SW11 is connected between the gate electrode of first amplifier AMP1 and signal line Sig11. The first precharge control switch SW11 functions to write a potential (first gate signal Vg1) of the signal line Sig11 to the first coupling capacitor Ccp1, detection capacitor Cf1 and parasitic capacitor Cpr1. The signal line Sig12 is connected to the source electrode of first amplifier AMP1. The first amplifier AMP1 functions to change first coupling signal Vs1 supplied thereto via the signal line Sig12 and first amplifier current iamp1 caused by a variation of first coupling signal Vs1 is output via the signal line Sig13 and terminal node13 when the sensor drive switch (SW3) is turned on.

As shown in FIG. 6 and FIG. 7, terminal node13 is connected to the input terminal of a first integration circuit 11 and first amplifier current iamp1 is supplied to the input terminal of the first integration circuit 11. The voltage of terminal node13 is set equal to voltage Vref1 by means of an operational amplifier and preset first amplifier current iamp1 is accumulated on integration capacitor C0. If the integration time is set to t, first integrated voltage Vout1 is set to a value expressed by the following equation (Eq. 7).

$$Vout1 = iamp1 \cdot t/C0 \qquad \text{Eq. 7}$$

Further, an output is reset by turning reset switch SW14 on.

As shown in FIG. 6, in the second sensor circuit 2, output switch SW22 for sensor selection is connected between the drain electrode of second amplifier AMP2 and signal line Sig23. Second coupling capacitor Ccp2 is connected between the gate electrode and source electrode of second amplifier AMP2. Parasitic capacitor Cpr2 is generated between the gate electrode of second amplifier AMP2 and the ground and detection capacitor Cf2 occurs if the input (touch) operation by the input means 30 is performed.

Second precharge control switch SW21 is connected between the gate electrode of second amplifier AMP2 and signal line Sig21. The second precharge control switch SW21 functions to write a potential (second gate signal Vg2) of the signal line Sig21 to the second coupling capacitor Ccp2, detection capacitor Cf2 and parasitic capacitor Cpr2. Signal line Sig22 is connected to the source electrode of second amplifier AMP2. The second amplifier AMP2 functions to change second coupling signal Vs2 supplied thereto via the signal line Sig22 and second amplifier current iamp2 caused by a variation of second coupling signal Vs2 is output via signal line Sig23 and terminal node23 when the sensor drive switch (SW3) is turned on.

As shown in FIG. 6 and FIG. 8, terminal node23 is connected to the input terminal of a second integration circuit 12 and second amplifier current iamp2 is supplied to the input terminal of the second integration circuit 12. The voltage of terminal node23 is set equal to voltage Vref2 by means of an operational amplifier and preset second amplifier current iamp2 is accumulated on integration capacitor C0. If the integration time is set to t, second integrated voltage Vout2 is set to a value expressed by the following equation (Eq. 8).

$$Vout2 = iamp2 \cdot t/C0 \qquad \text{Eq. 8}$$

Further, an output is reset by turning reset switch SW24 on.

As shown in FIG. 9, the first integrated voltage Vout1 is supplied to a differential circuit 20 from the first integration circuit 11. The second integrated voltage Vout2 is supplied to a differential circuit 20 from the second integration circuit 12. The differential circuit 20 outputs output voltage Vout. The output voltage Vout is set to a value expressed by the following equation (Eq. 9).

$$Vout = R2/R1(Vout2 - Vout1) \qquad \text{Eq. 9}$$

According to the liquid crystal display device including the sensor module according to the second embodiment configured as described above, the sensor module includes the first sensor circuit 1, second sensor circuit 2, first integration circuit 11, second integration circuit 12 and differential circuit 20. The differential circuit 20 can derive a difference between first integrated voltage Vout1 and second integrated voltage Vout2 to determine whether the input operation by the input means 30 is performed or not. Therefore, the same effect as that of the first embodiment can be attained.

The sensor module is provided on an array substrate and a portion of the sensor module is commonly used by plural wirings (signal lines) of the array substrate. As a result, for example, the number of wirings can be minimized.

Based on the above description, a liquid crystal display device including a sensor module whose size can be reduced and that is excellent in operational stability can be obtained.

Next, a liquid crystal display device including a sensor module according to a third embodiment is explained. In the embodiment, the same portions as those of the above embodiment are denoted by the same symbols, the detailed explanation thereof is omitted and the other configuration is the same as that of the second embodiment described above.

As shown in FIG. 10, in the first sensor circuit 1, switch SW13 is newly connected to the signal line Sig13. Signal line voltage Vprsg1 is applied to signal line Sig13 when the switch SW13 is turned on. Since preset capacitance Csig13 is present on the signal line Sig13 itself, a voltage is held on signal line Sig13 even if the switch SW13 is turned off.

If the signal line Sig13 is set to a voltage different from that of the signal line Sig12, the first amplifier current iamp1 flows and a voltage variation of $\int iamp1 dt/Csig13$ occurs on the signal line Sig13. First integrated voltage Vout1 corresponding to first amplifier current iamp1 is output by turning first output switch SW12 off after a preset period.

In contrast, in the second sensor circuit 2, switch SW23 is newly connected to the signal line Sig23. Signal line voltage Vprsg2 is applied to the signal line Sig23 when the switch SW23 is turned on. Since preset capacitance Csig23 is present on the signal line Sig23 itself, a voltage is held on the signal line Sig23 even if the switch SW23 is turned off.

If, in this state, the signal line Sig23 is set to a voltage different from that of the signal line Sig22, second amplifier current iamp2 flows and a voltage variation of $\int iamp2 dt/Csig23$ occurs on the signal line Sig23. Second integrated voltage Vout2 corresponding to second amplifier current iamp2 is output by turning second output switch SW22 off after a preset period.

The sensor module includes an operational amplifier 13 instead of the first integration circuit 11 and includes an operational amplifier 14 instead of the second integration circuit 12. The operational amplifier 13 includes an inverting input terminal, a non-inverting input terminal connected to terminal node13 and an output terminal connected to the differential circuit 20. The operational amplifier 14 includes an inverting input terminal, a non-inverting input terminal connected to terminal node23 and an output terminal connected to the differential circuit 20. The operational amplifiers 13, 14 are configured as non-inverting buffer circuits.

According to the liquid crystal display device including the sensor module according to the third embodiment configured as described above, the sensor module can be incorporated into a region of an array substrate (liquid crystal display panel) in which an integrated circuit although the sensor module does not include the first integration circuit 11 and second integration circuit 12 of the second embodiment.

The differential circuit 20 can derive a difference between the first integrated voltage Vout1 and second integrated voltage Vout2 to determine whether the input operation by the input means 30 is performed or not. Therefore, the same effect as that of the first and second embodiments can be attained.

Based on the above description, a liquid crystal display device including a sensor module whose size can be reduced and that is excellent in operational stability can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the display panel is not limited to the liquid crystal display panel and may be a display panel such as an organic electroluminescent panel configured to display an image.

What is claimed is:

1. A sensor module comprising:
a first sensor circuit comprising a first detection electrode whose detection capacitance varies according to an input operation by an input unit after a first precharge voltage is applied to the first detection electrode, a first amplifier formed of a thin-film transistor including a gate electrode connected to the first detection electrode and configured to adjust a first coupling signal supplied to a source electrode according to an attenuation amount of the first precharge voltage on the first detection electrode and output an adjusted first coupling signal from a drain electrode, and a first coupling capacitor connected between the source electrode and gate electrode of the first amplifier;
a second sensor circuit comprising a second detection electrode whose detection capacitance varies according to an input operation by the input unit after a second precharge voltage is applied to the second detection electrode, a second amplifier formed of a thin-film transistor including a gate electrode connected to the second detection electrode and configured to adjust a second coupling signal supplied to a source electrode according to an attenuation amount of the second precharge voltage on the second detection electrode and output an adjusted second coupling signal from a drain electrode, and a second coupling capacitor connected between the source electrode and gate electrode of the second amplifier; and
a differential circuit connected to the drain electrode of the first amplifier and the drain electrode of the second amplifier, wherein
the source electrode of the first amplifier is configured to be supplied with the first coupling signal set to a voltage level that is shifted to a negative side from a reference voltage when the first precharge voltage is applied to the first detection electrode and set to the reference voltage after the first precharge voltage is applied to the first detection electrode, and
the source electrode of the second amplifier is configured to be supplied with the second coupling signal set to a voltage level that is shifted to a positive side from the reference voltage when the second precharge voltage is applied to the second detection electrode and set to the reference voltage after the second precharge voltage is applied to the second detection electrode.

2. The sensor module according to claim 1, wherein an absolute value of a difference between the voltage level shifted to the negative side from the reference voltage and the reference voltage and an absolute value of a difference between the voltage level shifted to the positive side from the reference voltage and the reference voltage are the same value.

3. The sensor module according to claim 1, wherein the first precharge voltage and second precharge voltage are configured to adjust to set the adjusted first coupling signal and the adjusted second coupling signal to the same voltage level while an input operation by the input unit is not performed.

4. The sensor module according to claim 1, further comprising:

a first integration circuit connected between the drain electrode of the first amplifier and the differential circuit; and a second integration circuit connected between the drain electrode of the second amplifier and the differential circuit.

5. The sensor module according to claim 1, wherein the first sensor circuit further includes a first precharge control switch connected to the first detection electrode and configured to be selectively switched to one of a nonconductive state and conductive state in which the first precharge voltage is output to the first detection electrode, and a first output switch connected between the drain electrode of the first amplifier and the differential circuit and configured to be selectively switched to one of a nonconductive state and conductive state in which the adjusted first coupling signal is output to the differential circuit, and the second sensor circuit further includes a second precharge control switch connected to the second detection electrode and configured to be selectively switched to one of a nonconductive state and conductive state in which the second precharge voltage is output to the second detection electrode, and a second output switch connected between the drain electrode of the second amplifier and the differential circuit and configured to be selectively switched to one of a nonconductive state and conductive state in which the adjusted second coupling signal is output to the differential circuit.

6. The sensor module according to claim 1, wherein detection capacitances of the first and second detection electrodes are configured to be both changed according to the input operation by the input unit.

7. A display device comprising:

a display panel comprising an array substrate including a plurality of wirings and a plurality of pixels; and a sensor module comprising first and second sensor circuits arranged on the array substrate, and a differential circuit, wherein the first sensor circuit comprises a first detection electrode whose detection capacitance varies according to an input operation by an input unit after a first precharge voltage is applied to the first detection electrode, a first amplifier formed of a thin-film transistor including a gate electrode connected to the first detection electrode and configured to adjust a first coupling signal supplied to a source electrode according to an attenuation amount of the first precharge voltage on the first detection electrode and output an adjusted first coupling signal from a drain electrode, and a first coupling capacitor connected between the source electrode and gate electrode of the first amplifier, the second sensor circuit comprises a second detection electrode whose detection capacitance varies according to an input operation by the input unit after a second precharge voltage is applied to the second detection electrode, a second amplifier formed of a thin-film transistor including a gate electrode connected to the second detection electrode and configured to adjust a second coupling signal supplied to a source electrode according to an attenuation amount of the second precharge voltage on the second detection electrode and output an adjusted second coupling signal from a drain electrode, and a second coupling capacitor connected between the source electrode and gate electrode of the second amplifier, the differential circuit is connected to the drain electrode of the first amplifier and the drain electrode of the second amplifier, the source electrode of the first amplifier is configured to be supplied with the first coupling signal set to a voltage level that is shifted to a negative side from a reference voltage when the first precharge voltage is applied to the first detection electrode and set to the reference voltage after the first precharge voltage is applied to the first detection electrode, and the source electrode of the second amplifier is configured to be supplied with the second coupling signal set to a voltage level that is shifted to a positive side from the reference voltage when the second precharge voltage is applied to the second detection electrode and set to the reference voltage after the second precharge voltage is applied to the second detection electrode.

8. The display device according to claim 7, wherein portions of the first and second sensor circuits are configured to be commonly used by a plurality of wirings on the array substrate.

9. The display device according to claim 7, wherein an absolute value of a difference between the voltage level shifted to the negative side from the reference voltage and the reference voltage and an absolute value of a difference between the voltage level shifted to the positive side from the reference voltage and the reference voltage are the same value.

* * * * *